June 7, 1938. C. M. ROSS 2,120,076
SOLUBLE RESIN
Filed Feb. 13, 1936
Fig. 1.
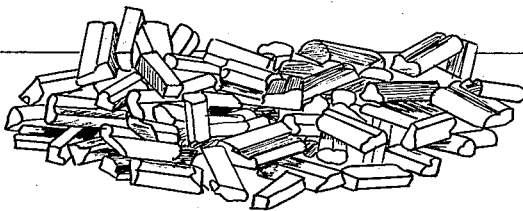
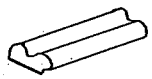          
Fig. 2.     Fig. 3.     Fig. 4.
INVENTOR.
Charles Martin Ross
BY
Barlow & Barlow
ATTORNEYS.

Patented June 7, 1938

2,120,076

UNITED STATES PATENT OFFICE 2,120,076

SOLUBLE RESIN

Charles Martin Ross, Mansfield, Mass., assignor to John D. Lewis, Incorporated, a corporation of Rhode Island Application February 13, 1936, Serial No. 63,725

2 Claims. (Cl. 134—26)

This invention relates to a soluble resin, and more particularly to the physical form of the soluble resin as it is supplied to the trade for use in the manufacture of varnishes, lacquers and various adhesive and coating compositions; and has for one of its objects the provision of a resin which may be more quickly placed in solution in larger quantities for use than has heretofore been the practice in the commercial use of such a resin in the form as previously sold.

It has been found that a powder frequently occurs when the ordinary resin of commerce is broken up for purposes of dissolving in the solvent, and this powder has created many difficulties owing to its tendency to form a jell with the solvent and thus prevents or lessens the penetration of the solvent substance into the resin and thereby considerably slows up the solvent action on the resin; and another object of the invention is the provision of a resin in such form as to be free from such powder.

Another object of the invention is to provide a resin in a form which will assist in a uniform dispersion of the solvent and thus cause the solvent to be readily conducted to the resin as the same is applied thereto and to quickly permeate the same.

Another object of the invention is to provide a soluble resin in a form which may be more easily handled.

Another object of the invention is to reduce the fire hazard caused by the dust usually present when breaking up a solid.

Another object of the invention is to improve the health condition attendant to the handling of this resin by reduction of the dust present and also by minimizing dust settling on machinery to prevent its gumming in the course of relatively short periods of time.

A still further object of the invention is to provide a resin of such units of size that there is but little tendency to oxidize, particularly when compared to a resin powder where a large area is exposed.

With these and other objects in view, the invention consists of certain novel features of construction, as will be more fully described, and particularly pointed out in the appended claims.

In the accompanying drawing:

Fig. 1 in the drawing represents the resin material in the state of molded uniformly formed masses in an assembled piled relation and free from a powder coating on their exterior surfaces;

Fig. 2 is a perspective view of one shape into which the individual units illustrated in Fig. 1 may be molded; Fig. 3 is a perspective view of another molded shape of resin unit shown in Fig. 1; and Fig. 4 is a perspective view illustrative of a further modified shape of molded resin unit shown in Fig. 1.

A soluble resin, such for instance as ester gum, may be of a form which is soluble in an oil, acetone, alcohol or one of the various resin solvents. The common way of handling such resins is to pour them while heated and in a melted, liquid form, into a shipping drum container and there allowed to become solidified therein upon cooling after which the drum and its contents are shipped to the user in the field. The procedure followed by the user usually is to cut off the upper end or top head of this drum, after which he rips down the side of the drum, opening it up to expose the hard solidified resin mass, and he then breaks up or crushes this cold brittle resin into smaller irregular pieces or chunks before subjecting it to solution by his solvent and by the application of heat until the pieces are dissolved to make varnish or the like therefrom.

In breaking up this solid cake it is found that a considerable amount of powder is formed due to the brittleness of the cake and this powder coats the larger lumps so that when the solvent is applied and contra to that which might be expected, a sort of a jell forms over the resin lump material and thereby prevents and retards to a considerable extent the penetration of the solvent into the lumps of the resin which provide the greater part of the mass. Furthermore, due to the breaking up a solid chunk of resin in this manner, uneven particles are provided which often will go into solution difficultly and unevenly with a possibility of the formation of a less uniform varnish by reason of some parts being more overheated than other parts during the dissolving process or the incorporation of large undissolved lumps therein which might be objectionable.

The dust formed in this breaking up of a large cake is of such amount that the men in my assignee's plant wear masks while breaking up this material, although the dust is not known to be toxic. Further, this dust settles on machinery which will gum in a relatively short period of time as compared with the use of the present invention, and the dust presents a real fire hazard in the breaking up of a solid cake of ester gum.

In order to avoid these objections in the handling of the prior resin material and instead of casting the resin in a large solid chunk within a shipping drum in which it must be broken up for use, I form or mold the resin into small masses, such as pellets or sticks of uniform dimension which may be readily taken from a storage container without injury to the container and placed in a receptacle and when packed together will leave spaces between them so that a solvent when applied will quickly distribute itself through the heap of sticks and more quickly penetrate these sticks by reason of their freedom from dust, powder or the like, than has heretofore been the practice.

Further, the short sticks may be much more easily handled than where a large solid mass of drum size is had, the drum for which previously had to be destroyed in order to make the same available, while in accordance with the present invention the containers or drums may be utilized over and over again because these resin particles may be extracted from the drum without the necessity for breaking the same.

Then, again, due to the freedom of ground up or powder formed by the old method of handling, there is less oxidizing opportunity as the surface is much reduced. Also, by reason of the dispersion of this material throughout the solvent, the heat of the solvent is more quickly conducted to these small resin masses so that they not only melt very uniformly but melt much quicker and get into solution faster than in the old form commonly used in the art at the present time.

It is to be understood that the term "short sticks" as used in this specification and claims is intended to be associated with masses or bodies of elongated shape.

The foregoing description is directed towards the method and construction illustrated, but I desire it to be understood that I reserve the privilege of resorting to all the equivalent changes to which the construction and method are susceptible, the invention being defined and limited only by the terms of the appended claims.

I claim:

1. An intermediate article to be dissolved for liquid use in varnish or the like comprising an ester gum in the form of short sticks, the outer surfaces of which are free from substantial amounts of powdered particles of the gum up to the time of use and are shaped to provide spaces between the sticks when amassed in piled relation.

2. An intermediate article to be dissolved for liquid use in varnish or the like comprising an ester gum in the form of short sticks, the outer surfaces of which are provided with grooves or ridges to form additional spaces between the sticks when amassed in piled relation and which are free from substantial amounts of powdered particles of the resin up to the time of use.

CHARLES MARTIN ROSS.